United States Patent [19]
DeRees

[11] Patent Number: 5,806,910
[45] Date of Patent: Sep. 15, 1998

[54] VEHICLE ADJUSTABLE SLING SEAT

[75] Inventor: Delbert D. DeRees, Romeo, Mich.

[73] Assignee: Chrysler Corporation, Auburn Hills, Mich.

[21] Appl. No.: 641,257

[22] Filed: Apr. 30, 1996

[51] Int. Cl.[6] .............................. B62D 25/04; B60N 1/00
[52] U.S. Cl. ..................... 296/63; 296/65.1; 297/452.13; 244/122 R
[58] Field of Search .......................... 296/63, 65.1, 68.1; 297/284.2, 452.13, 440.11; 244/122 R, 118.6

[56] References Cited

U.S. PATENT DOCUMENTS

| | | |
|---|---|---|
| 2,080,761 | 5/1937 | Crawford ............................ 297/452.13 |
| 2,556,076 | 6/1951 | Evans et al. ......................... 244/122 R |
| 2,829,702 | 4/1958 | Keating ............................ 244/122 R X |
| 3,110,380 | 11/1963 | Meyer et al. . |
| 4,047,752 | 9/1977 | Rohr . |
| 4,188,063 | 2/1980 | Dusart . |
| 4,252,367 | 2/1981 | Vanderminden ................ 297/440.11 X |
| 4,258,951 | 3/1981 | Groom . |
| 4,474,347 | 10/1984 | Hazelsky .............................. 244/122 R |
| 4,533,110 | 8/1985 | Hill . |
| 4,568,107 | 2/1986 | Biviano . |
| 4,602,816 | 7/1986 | Chandler . |
| 4,679,840 | 7/1987 | Fry et al. . |
| 4,825,483 | 5/1989 | Nassar ............................. 297/452.13 X |
| 5,342,111 | 8/1994 | Charles . |

*Primary Examiner*—Joseph D. Pape
*Attorney, Agent, or Firm*—Thomas G. Pasternak

[57] ABSTRACT

An adjustable sling seat for a motor vehicle occupant compartment defined by a floor and an overhead roof structure. A flexible webbing has its forward end connected to a webbing storage roller assembly rotatably supported about a transverse axis on a floor mounted front anchorage mechanism while the webbing aft end is connected to a roof mounted rear anchorage mechanism. The webbing slack length, suspended between the front and rear anchorage mechanisms, defines a forward seat cushion surface portion and an aft seat back surface portion. A roller take-up spring clutch includes a pintle member, aligned on the roller axis, pivotally connecting one end of the roller to a clutch rotary control knob. Turning the knob rotates the roller in either direction, for shortening or lengthening the slack length, thereby either raising or lowering the seat cushion surface portion. The front anchorage mechanism includes a roller assembly bracket, pivoted to a floor mounted base, wherein a latching arrangement acting between the roller pivot bracket and the base enables the bracket to be unlatched for forward and aft arcuate adjustment of the roller assembly. The rear anchorage mechanism is operable by the seat occupant to slidably vary the webbing aft end connection, thereby adjusting the position and angle of inclination of the seat back surface portion. The webbing storage roller cylindrical wall, covered by padding material subjacent the webbing, provides an adjustable cushioned leg rest for the seat occupant.

14 Claims, 6 Drawing Sheets

VEHICLE ADJUSTABLE SLING SEAT

FIELD OF THE INVENTION

This invention relates to a vehicle sling seat and, more particularly, to an adjustable sling seat for a vehicle driver or passenger.

BACKGROUND OF THE INVENTION

As current vehicle seats are relatively heavy, the automotive industry is concerned with developing a light weight individual vehicle seat that may be economically mass produced for use in a light weight vehicle. It is known to provide auxiliary sling seats for vehicles, employing flexible supporting sheets for spanning the seat frame, which sheets are adapted to conform to the body of the seat occupant. Attempts to design a low cost adjustable sling seat which offers an acceptable range of positions for drivers of varying build has proved a difficult task.

SUMMARY OF THE INVENTION

It is a feature of the present invention to provide a vehicle sling seat including a webbing slack length suspension arrangement forming a seat cushion surface portion and a seat back surface portion, with the webbing forward end connected to a webbing storage roller, supported for rotation about a transverse axis on a floor mounted front anchorage mechanism, and wherein the webbing aft end is connected to an overhead mounted rear anchorage mechanism.

It is another feature of the invention wherein the vehicle sling seat webbing storage roller is part of a roller assembly supported on a pivot bracket of the front anchorage mechanism, and wherein the roller assembly includes clutch means, manually operated by turning a control knob to rotate the roller in either direction to selectively shorten or lengthen the webbing, thereby varying the height of the seat cushion surface portion, and wherein the clutch means frictionally holds the webbing at the selected seat height.

It is another feature of the present invention wherein the sling seat rear overhead mounted anchorage mechanism includes a fore and aft adjustable slide arrangement having a manual locking device, enabling the seat occupant to lock the webbing aft end in a plurality of selected positions, thereby varying the fore and aft position and angle of inclination of the webbing seat back surface portion.

It is still another feature of the invention wherein the front anchorage mechanism includes a roller assembly pivot bracket, supported on fixed pivots of a floor mounted base, permitting fore and aft arcuate positioning of the webbing slack length forward end.

It is a further feature of the invention wherein the webbing storage roller has its cylindrical wall cushioned by padding material, thereby providing an adjustable leg rest for the seat occupant. A front anchorage mechanism latching arrangement, acting between the base and the pivot bracket, allows the pivot bracket to be unlatched for rotational adjustment of the roller assembly to a plurality of fore and aft arcuate positions, selectively varying the position of leg rest and the forward end anchorage of the webbing length.

It is yet another feature of the invention to provide roller assembly clutch means which include a wind-up helical coil spring concentrically encircling a pintle member wherein, upon turning a clutch control knob to a selected webbing slack length, the spring exerts a frictional force on a clutch housing, preventing rotation of a coupling member interconnecting a pintle cross-blade, having its free ends interlocked with diametrically opposed cutouts on one annular edge of the roller, whereby the clutch holds the webbing slack length at the selected setting.

These and other features and advantages of the invention will be more fully understood from the following detailed description of the invention taken together with the accompanying drawings.

DETAILED DESCRIPTION OF THE INVENTION

Figure 1:
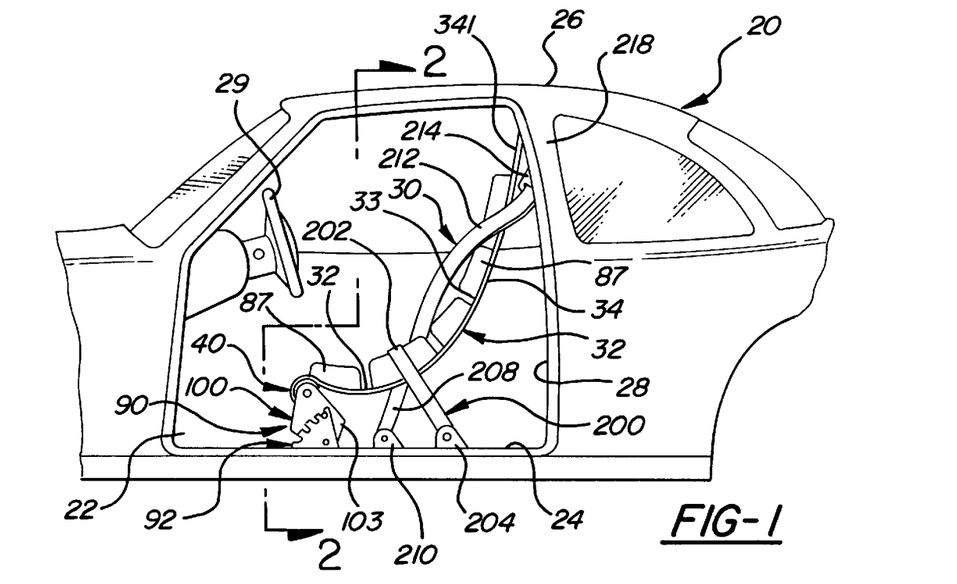
FIG. 1 is a fragmentary side view of a motor vehicle body, with a side door removed, showing a front sling seat in accordance with the present invention.

Referring now to the drawings in detail, numeral 20 in FIG. 1 generally indicates a two door vehicle body provided with a passenger compartment 22, partially defined by a floor 24 and an overhead roof structure 26. The passenger compartment 22 has a side door opening 27 closed by a door, shown at 28 in FIG. 2, permitting access to a seating area, which includes a steering wheel 29 installed in a conventional manner relative to a driver's sling seat 30.

Figure 4:
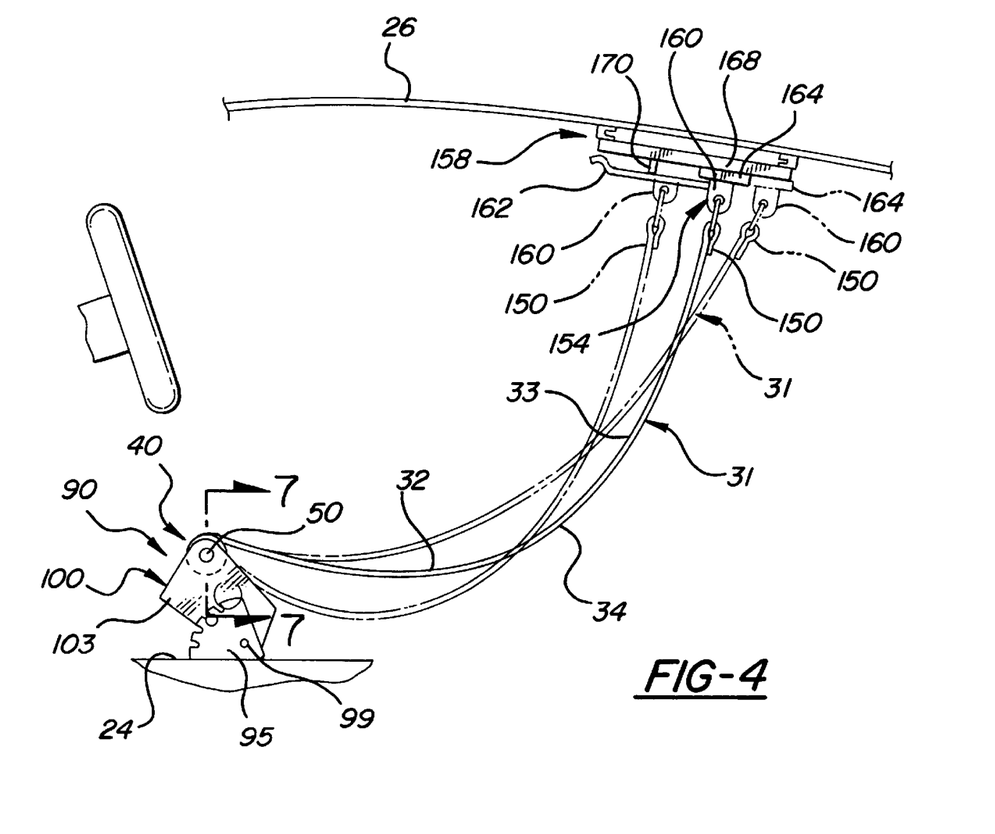
FIG. 4 is an enlarged fragmentary diagrammatic side view of a portion of FIG. 1, showing the outboard rear overhead slide mechanism in three selected positions.

The sling seat 30 includes a flexible elongated, generally rectangular, flexible sheet webbing 31 which, in the disclosed embodiment, is an elastomer stretch netting fabric material. It will be understood that the term webbing is intended to include various forms of flexible sheet material, such as woven or knitted fabric made from synthetic fiber, canvas, etc. As seen in FIG. 4, the suspended webbing 31, which defines a forward seat cushion surface portion 32 and an aft seat back surface portion 33, includes coextensive woven belt-like side supporting straps 34 suitably secured, as by sewing, to bordering side edges of mesh-like fabric 35. It will be noted in FIG. 2 that upper end lengths 34' of the straps 34 extend a predetermined dimension beyond webbing transverse aft terminal hem strip 36. Each end length 34' is connected with a slidable locking device of an associated rear anchorage mechanism, discussed below, mounted to the overhead roof structure 26.

Figures 8, 10, 11:
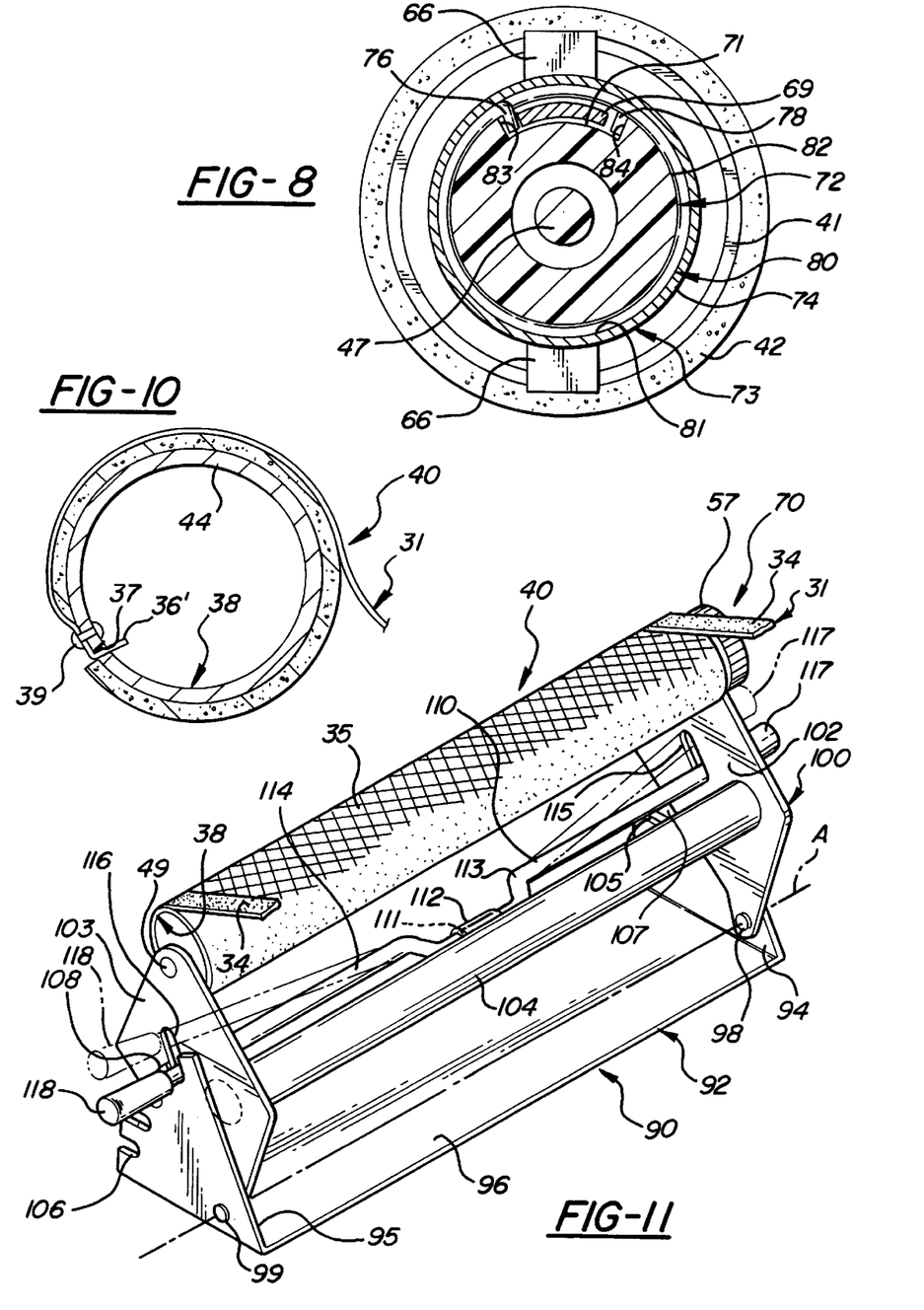
FIG. 8 is an enlarged, fragmentary, cross-sectional view, partly in elevation, taken on the line 8—8 of FIG. 7.
FIG. 10 is an enlarged, fragmentary, cross-sectional view taken on the line 10—10 of FIG. 7.
FIG. 11 is a perspective view of the roller arrangement and anchorage arrangement of FIG. 5.

FIG. 10 shows a transverse front edge hem strip 36' of the webbing 31, received through axially extending slot 37 in a webbing storage roller 38, with the front edge strip 36' fastened to the roller by suitable means, such as by a plurality of rivets 39. The roller 38, which is part of roller assembly 40, includes a cylindrical wall 41 covered by resilient padding material, such as a layer of foam rubber 42. It will be appreciated that the forwardly positioned webbing storage roller, by virtue of being covered with foam rubber padding subjacent the webbing, also functions as an adjustable cushioned leg rest for the seat occupant.

Figure 7:
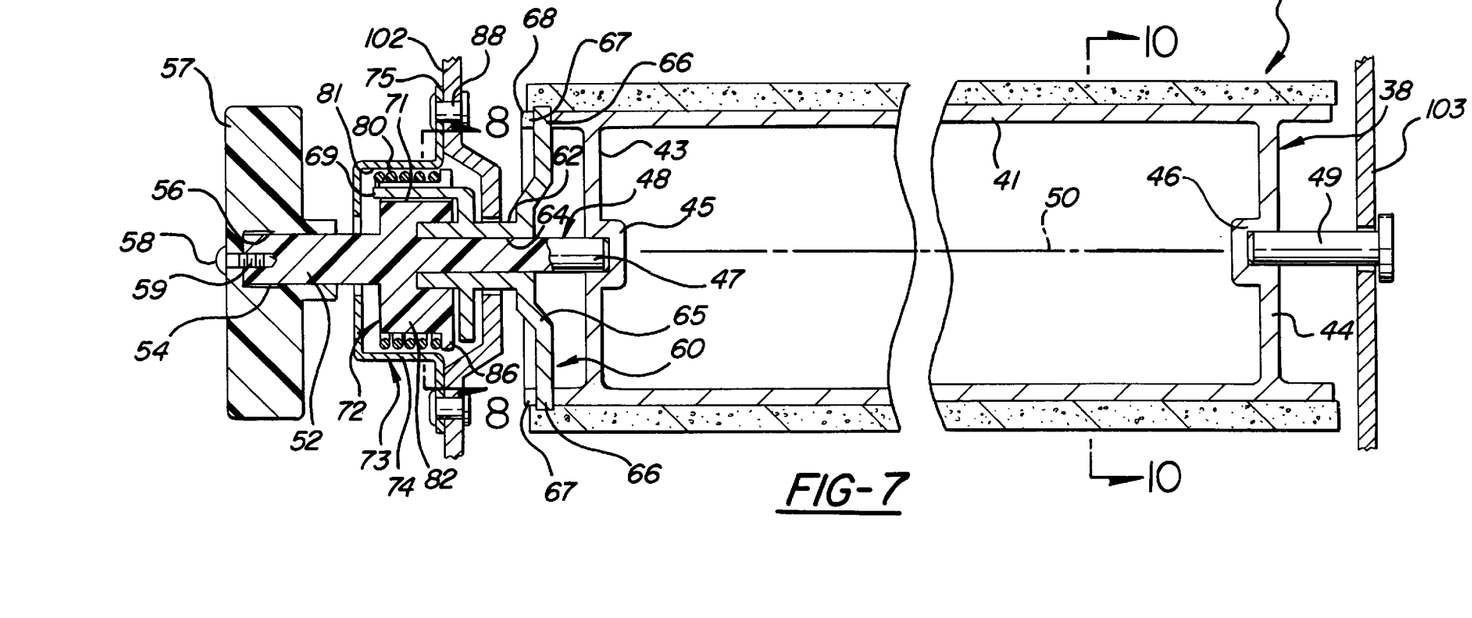
FIG. 7 is an enlarged, fragmentary, cross-sectional view, partly in elevation, taken on the line 7—7 of FIG. 4.

As seen in FIG. 7, the roller 38 is closed by inboard 43 and outboard 44 end walls, with the end walls 43, 44 formed with oppositely facing inboard 45 and outboard 46 pivot sockets. Outboard end 47 of a spindle member 48 is journaled in the roller inboard socket 45, while an outboard pivot pin 49 is journaled in the roller outboard socket 46. The spindle member 48 and pivot pin 49 are aligned on first transverse roller axis 50. An enlarged inboard end 52 of the spindle member 48 is splined at 54 in an axial bore 56 of a clutch rotary control knob 57. Screw fastener 58, threaded in spindle inboard axial bore 59, axially retains the control knob 57 on the spindle member inboard end.

Figure 9:
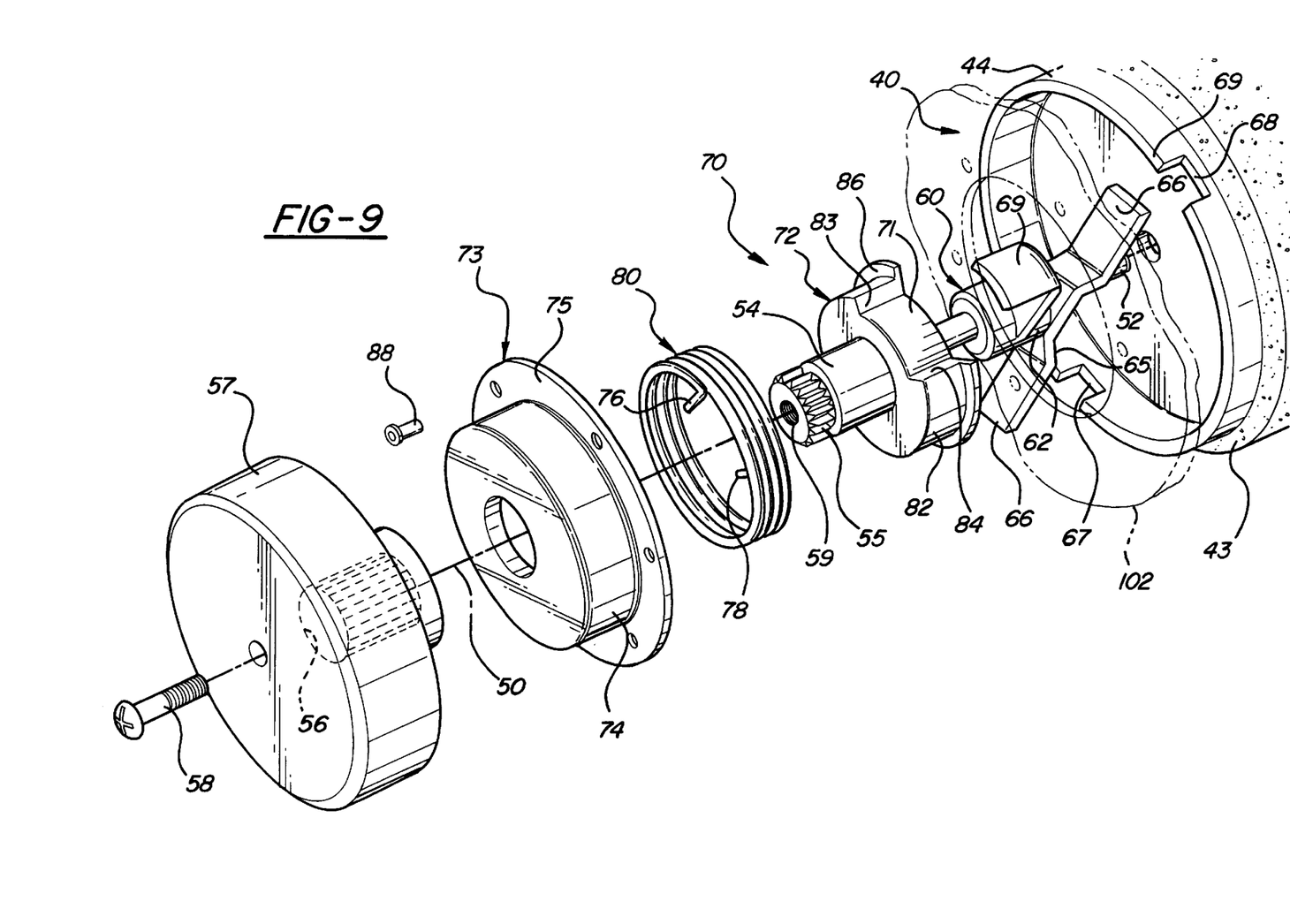
FIG. 9 is an enlarged, fragmentary, exploded perspective view of the clutch and roller arrangement of FIG. 7.

The roller assembly 40 further includes a coupling member, generally indicated at 60, provided with a central spool 62 having an axial bore 64 suitably secured, as by splines, to an intermediate portion of the spindle 48. The coupling member spool 62 has one outboard end fixed to a cross-blade 65, in the form of diametrically opposite radial blade ends 66, adapted for rotation about the roller axis 50. FIG. 9 shows the cross blade having each of its associated free ends 66 received in an associated cutout 67, formed in inboard annular edge 68 of the roller cylindrical wall 41. The coupling spool 62 has its opposite inboard end joined to an axially extending drive key 69 of a roller assembly control clutch 70 described below.

As best seen in FIG. 7, the control clutch 70 is of the conventional "wind-up" spring type, an example of which is disclosed in U.S. Pat. No. 3,110,380, issued Nov. 12, 1963 to Meyer et al. The Meyer clutch, designed for use between a vehicle window crank handle and the window support, functions to irreversibly hold a window in any adjusted position, while allowing up and down window positioning by the handle.

With reference to FIGS. 7, 8, and 9, the clutch drive key 69, of circular cross section, is received in axially extending annular slot 71 of a clutch spring retainer hub 72 located within clutch housing 73. The clutch housing 73 includes cylindrical side wall 74 terminating in a radial flange 75. The retainer slot 71, as seen in FIG. 8, receives inwardly bent ends 76 and 78 of a helical coil spring 80. FIG. 7 shows the spring 80 received in an annular concentric space defined between housing wall inner surface 81 and retainer hub outer cylindrical wall 82. It will be noted in FIG. 8 that the spring bent ends 76 and 78 are located in adjacent spaced relationship to their respective radial walls 83 and 84 of retainer slot 71.

As seen in FIG. 7, the retainer hub 72 is further provided with a radially extending annular flange 86 which seats and locates one terminal coil of the spring 80 and prevents the bent ends 76 and 78 from slipping out of the slot 71. The housing radial flange 75 is suitably secured, as by a plurality of spaced rivets 88, to a link plate of webbing forward anchorage mechanism, generally indicated at 90 in FIG. 1.

The clutch 70 is operated by turning the rotary control knob 57 in either direction, causing one of the retainer slot walls 83 or 84 to engage a respective spring bent end 76 or 78, thereby partially winding the spring 80 in the direction of rotational movement of the spindle member 48. This bent end engagement partially releases the spring 80 from frictional contact with housing side wall inner surface 81, allowing the spring to rotate with the spindle member. Engagement of one or the other of the spring bent ends with a side edge of the key 69 rotates the key, together with the spindle member 48, spring 80, cross blade 65, and roller 38 to adjust the seat webbing slack length. Turning the rotary control knob 57 adjusts the webbing slack length, whereby the height of the webbing seating surface portion 32 is varied.

The seat may be occupied, without perceptible rotation of the roller, because of the frictional engagement of the spring 80 with the housing inner surface 81. Upon the seat being occupied, a slight rotation of the roller results in one of the key side edges contacting an adjacent spring bent end 76 or 78. The force on such key side edge tends to unwind the spring, increasing its frictional engagement with the housing inner surface 81, thereby holding the roller against further rotation.

Figure 2:
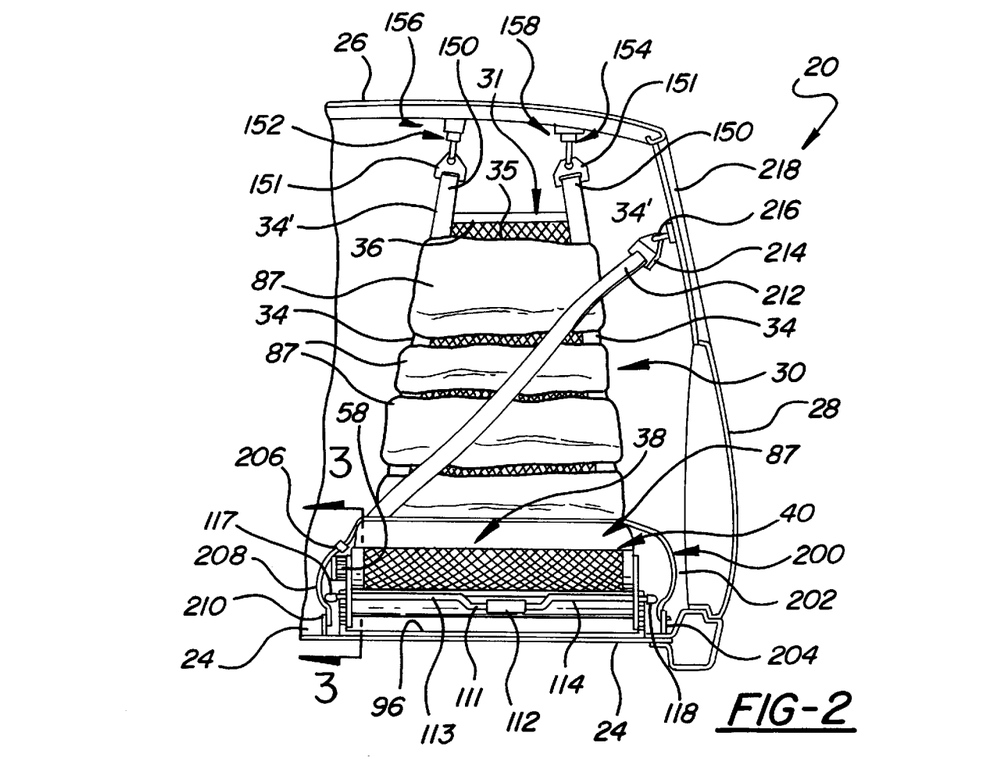
FIG. 2 is a fragmentary cross-sectional view, taken on the line 2—2 of FIG. 1.

As seen in FIGS. 1 and 2, the sling seat cushion surface portion 32 and the seat back surface portion 33 are adapted for supporting a plurality of elongated cushions 87, arranged in a parallel spaced manner. Each cushion is adapted for releasable attachment by suitable means, such as by VELCRO™ tapes, to an associated side strap 34. Thus, as best seen in the modified sling seat 180 of FIG. 5, wherein webbing side straps 182 are substantially parallel, each side strap has a plurality of VELCRO™ loop tapes 88 secured thereto, in a corresponding manner, to each side strap 182 for releasable mating engagement with an associated VELCRO™ hook tape 89, secured on each underside edge of the cushions 87.

Figure 3:
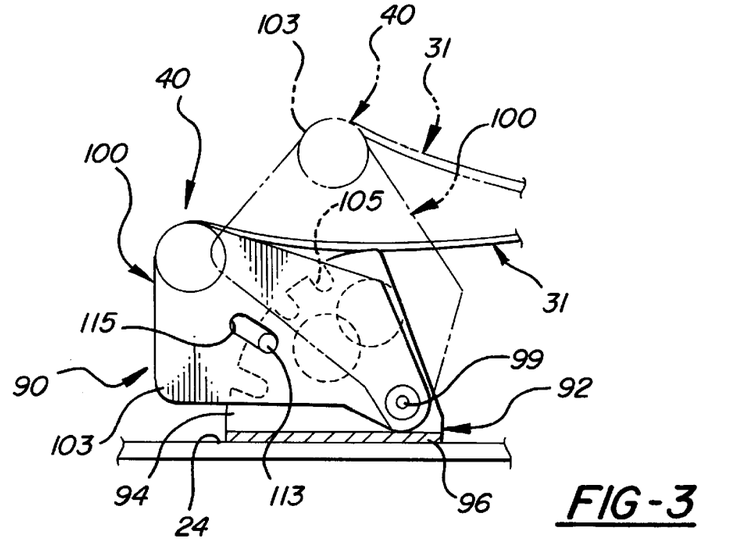
FIG. 3 an enlarged fragmentary cross-sectional view, taken on the line 3—3 of FIG. 2.
Figure 5:
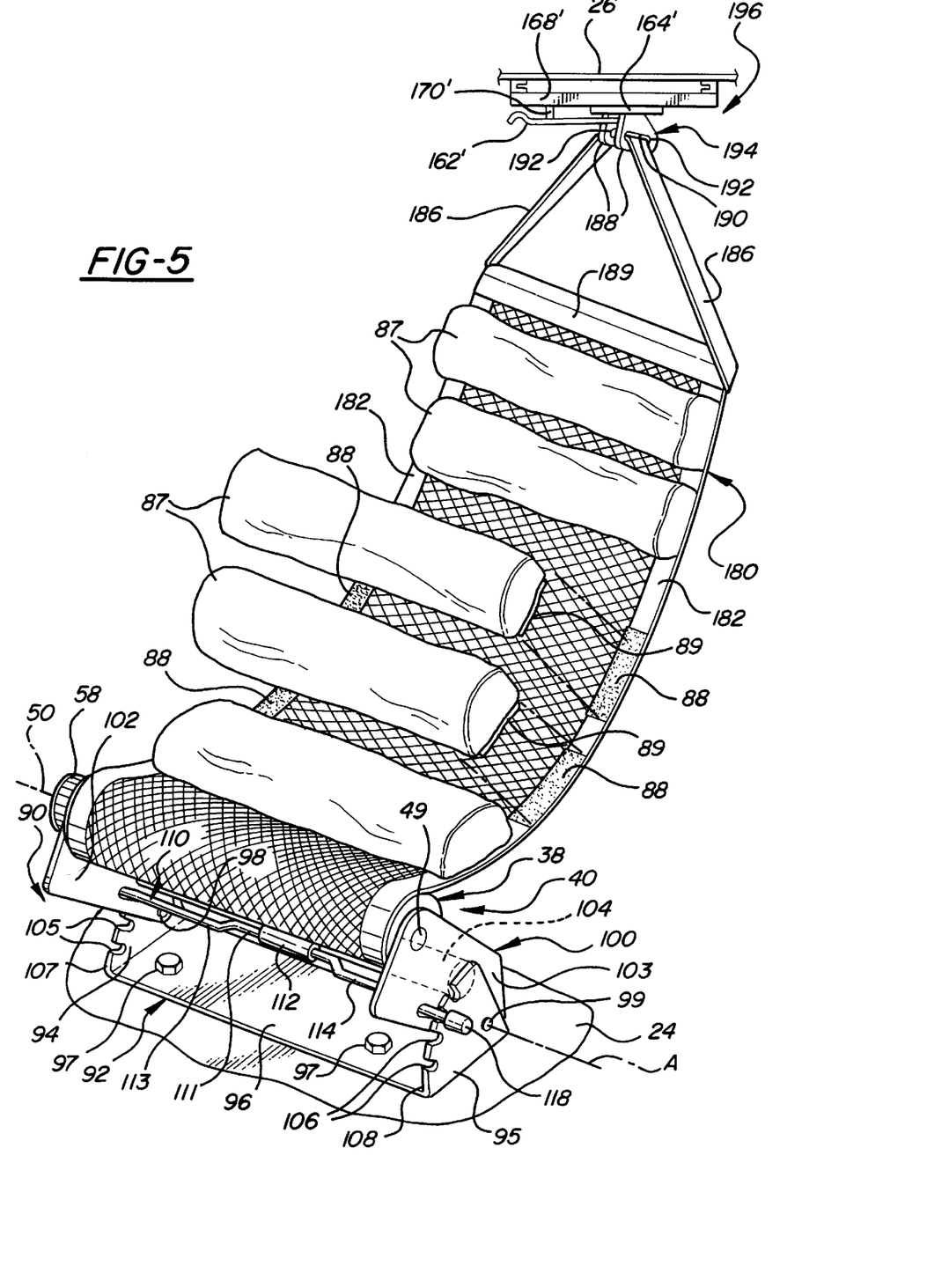
FIG. 5 is an enlarged, fragmentary, perspective view of a modified sling seat.

Referring to FIGS. 3 and 5, the forward anchorage mechanism 90 includes a floor mounted U-shaped base 92, formed with inboard 94 and outboard 95 base sector plate legs, upstanding from the ends of base bight panel 96 anchored to the floor 24 by bolts 97. Each leg 94 and 95 has an associated pivot pin 98 and 99, supporting a pivot bracket 100 for rotation about a second transverse axis A. As best seen in FIG. 11, the pivot bracket 100 includes inboard 102 and outboard 103 linking arms joined by a transverse cross-brace. In the preferred embodiment, the cross-brace 104 is a steel torque tube, with the tube ends welded to the inner surface of associated linking arms 102 and 103.

As best seen in FIG. 11, the inboard 94 and outboard 95 sector legs are each formed with a plurality of mirror image, radially disposed, detent notches 105 and 106 respectively, having a common center of curvature on second pivot axis A. The open ends of detent notches 105 and 106 are equally spaced in an associated sector leg arcuate edge 107 and 108.

A double crank-shaped rod 110, bent from a one-piece length of steel bar stock, defines a center stirrup length 111 attached by a weld bracket 112 to the midpoint of the torque tube 104. The rod 110 defines inboard 113 and outboard 114 coaxial, oppositely extending, latching lever rod lengths, with an end portion of each rod length received in associated inboard 115 and outboard 116 link plate arm radial release slots. The inboard 113 and outboard 114 rod lengths have associated inboard 117 and outboard 118 handle grips on their opposite free ends. The handle grips allow the occupant to flex the rod length 113, 114 to their unlatched positions, clear of their associated notches 105 and 106, wherein each rod length end portion is held in a radially outward end of its associated release slot 115 and 116, as shown in phantom-lines in FIG. 11. With each rod length clear of its associated detent notches 105, 106, the pivot bracket 100 and roller assembly 40 are free to be rotated about second axis A. Upon the pivot bracket being moved to a selected forward or aft arcuately adjusted position, the occupant releases the flexed handles 117 and 118 for biased return of each rod length 113 and 114 into latched engagement with an associated, radially aligned, notch 105 and 106.

With reference to FIG. 2, the upper aft extended portion 34' of each webbing side strap 34 terminates in a stitched loop 150, looped through a slot of an anchor plate 151 and pivoted to a respective inboard 152 and outboard 154 lower locking device. Each lower locking device 152 and 154 is part of an associated inboard 156 and outboard 158 longitudinally extending slide mechanism, secured in side-by-side, laterally spaced relation to overhead roof structure 26. While only the outboard slide mechanism 158 is shown in FIGS. 4, 6, and 6A, it will be noted that the slide mechanisms 156 and 158 are identical.

Figure 6:
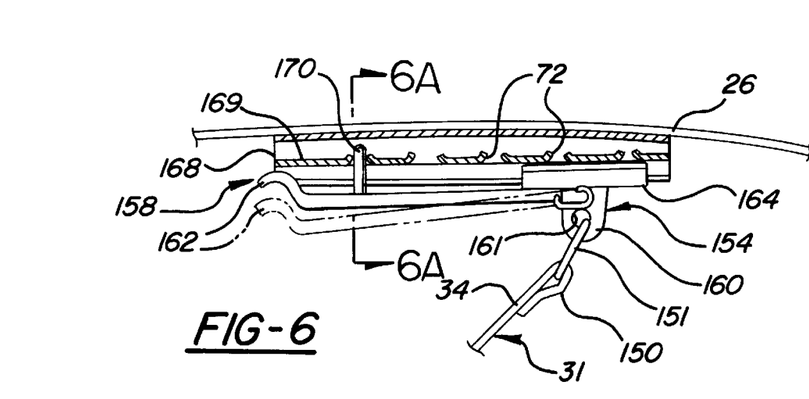
FIG. 6 is an enlarged, fragmentary longitudinal cross-sectional view, partly in elevation, of the rear overhead adjustment mechanism of FIG. 4.
Figure 6A:
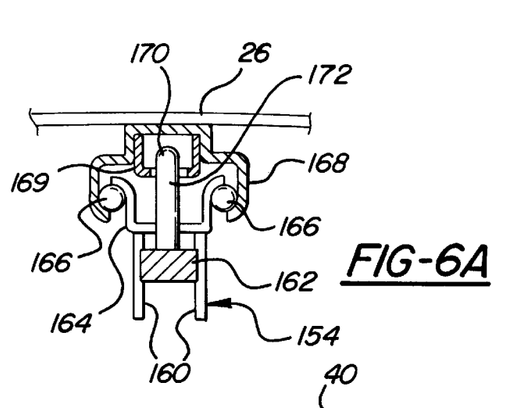
FIG. 6A is an enlarged, fragmentary transverse sectional view, partly in elevation, taken on the line 6A—6A of FIG. 6.

Referring to FIGS. 6 and 6A, the lower lock device 154 includes bifurcated supports 160, having aligned holes 161 for pivotal reception of an associated anchor plate 151, with the bifurcated supports 160 welded to an aft end of a forwardly cantilevered operating lever bar 162. The lock device 154 further includes a lower channel-shaped rail 164, while a plurality of load transmitting ball bearings 166 are seated between an inverted channel-shaped upper track 168 and the lower rail 164. As seen in FIG. 6A, the upper inverted channel 168 includes a U-shaped internal rack 169 welded thereto. As the upper track 168 is fixedly secured to the roof structure 26, the lower rail 164 slides longitudinally relative to the upper track 168, permitting fore and aft adjusting movement of the associated outboard extended strap portions 34'.

As seen in FIGS. 6 and 6A, the lever bar 162 has an upstanding keeper pin 170 welded thereto, adjacent its forward free end, adapted to be received in one of a series of longitudinally extending keeper openings 172 of internal rack 169. The flexible bar 162 is shown biased into its normal locked mode with the pin 170 received in an aligned keeper opening 172. Upon flexing the bar 162 downwardly to its phantom-line position, the pin 170 clears its aligned keeper opening, unlocking the slide mechanism 158 and allowing the lower rail 164 and the lock device 154 to be slidably adjusted fore and aft. It will be noted that the sling seat 30 requires the seat occupant to unlock both anchoring slide mechanisms 156 and 158 to adjust the inboard and outboard extended strap portions 34'.

With reference to FIG. 5, a modified webbing 180 is shown having its upper aft end provided with substantially parallel side straps 182, each ending in a strap end length 186 of predetermined dimension, having its free end formed with a stitched loop 188. A rigid crossmember 189 connects the upper ends of side straps 182. The strap portion free ends converge, wherein each loop 188 is looped through a slot 190 in an associated one of bifurcated supports 192, which extend downwardly from a locking device 194. A longitudinally extending rear anchorage slide mechanism 196 is shown mounted on overhead roof structure 26. As the rear anchorage mechanism 196 is identical to the above described rear anchorage mechanism 158, corresponding elements have the same reference numerals, except that the anchorage mechanism 196 elements are primed. It will be appreciated that the single aft anchorage mechanism 196 of FIG. 5 enables a seat occupant to readily adjust the modified sling seat webbing 180, as compared to the pair of slide anchorage mechanisms 154 and 156.

Referring to FIGS. 1 and 2, it will be seen that a three-point seat belt arrangement for the sling seat, generally indicated at 200, includes a lap belt 202 having its one outboard end fixed to the floor 24 by outboard bracket 204. FIG. 2 shows the lap belt 202 inboard end having a latch plate, not shown, releasably secured to a buckle 206, fixed to an upper end of floor mounted tether strap 208, while the tether strap 208 lower end is fixed to the floor by inboard floor bracket 210. A shoulder belt 212 has its lower end fixed to the inboard end of lap belt 202, while the upper end of shoulder belt 212 is looped through a ring plate 214 pivoted to a side loop 216 mounted on the body side wall structure or B pillar 218.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. An adjustable sling seat for a vehicle occupant compartment defined by a floor and an overhead structure, said adjustable sling seat comprising:

a webbing of flexible sheet material having a forward end, a roller assembly, said forward end connected to said roller assembly, a floor mounted front anchorage means, said roller assembly supported on said floor mounted front anchorage means for rotation about a first transverse axis an overhead structure mounted rear anchorage means, said webbing having an aft end connected to said rear anchorage means, whereby a webbing slack length formed from said webbing is suspended between said front and rear anchorage means defining a forward seat cushion surface portion and an aft seat back surface portion;

said roller assembly comprising a roller clutch means, a webbing storage roller, and a clutch means rotary control, said roller clutch means interconnecting said webbing storage roller to said clutch means rotary control, whereby turning said control rotates said roller in a first direction, shortening the webbing length and selectively raising said webbing seat cushion portion, and turning said control in a second direction rotates said roller in a second direction, lengthening said webbing slack length and selectively lowering said seat cushion surface portion.

2. The adjustable sling seat as set forth in claim 1 wherein said rear anchorage means comprises at least one rear anchorage slide mechanism, provided with a locking device, adapted for longitudinal sliding movement thereon, said rear anchorage means further comprising means for connecting said webbing aft end to said locking device thereby enabling the seat occupant to place said device in a locked mode, holding the webbing aft end in a fixed position, and in an unlocked mode, enabling the seat occupant to slide the locking device to a plurality of locked positions, thereby varying the longitudinal position and angle of inclination of said webbing seat back surface portion.

3. The adjustable sling seat as forth in claim 2 wherein each said slide mechanism comprises an upper track member fixedly secured to the overhead structure, and a lower rail member slidably received in said upper track member for reciprocal travel thereon, said locking device secured to said lower rail member and comprising an operating bar having one end fixed to said rail member and a keeper member secured to the bar adjacent an opposite end, a plurality of longitudinally spaced keeper openings on said upper track, said keeper member adapted for selective reception in said keeper openings, wherein moving said bar in one direction unlocks said keeper member from a keeper opening, allowing the seat occupant to slide the lower rail and locking device either fore or aft to an adjusted location of said webbing aft end, whereby movement of said bar in an opposite direction inserts said keeper member in a selected keeper opening thereby locking said webbing aft end at said adjusted location.

4. The adjustable sling seat as set forth in claim 1 wherein said front anchorage means comprises a front anchorage mechanism having a pivot bracket pivotally supported thereon for rotation about a second transverse axis, said pivot bracket supporting said roller assembly for rotation about said first transverse axis, and latch means operative to releasably hold said pivot bracket on said front anchorage mechanism at a plurality of fore and aft arcuately spaced positions, whereby said roller assembly is adapted for selective fore and aft arcuate positioning, thereby varying the fore and aft location of said seat cushion surface portion.

5. The adjustable sling seat as set forth in claim 1 wherein said front anchorage means comprises a base, fixed to the floor, and a pivot bracket supported on said base for rotational movement about a second transverse pivot axis, said pivot bracket supporting said roller assembly for rotation about said first axis, and latch means acting between said pivot bracket and said base adapted to be unlatched for selective pivoting of said pivot bracket and said roller assembly to a plurality of fore and aft arcuate positions, wherein latching said latch means selectively fixes the fore and aft location of said roller assembly.

6. The adjustable sling seat as set forth in claim 5 wherein said webbing storage roller has an exterior cylindrical wall surface, covered by padding material over which said webbing is stored, whereby said storage roller provides a fore and aft arcuately adjustable cushioned leg rest for the sling seat occupant.

7. The adjustable sling seat as set forth in claim 5 wherein said base comprises a U-shaped structure having a bight portion secured to the floor, joining a pair of transversely spaced apart, upstanding sector plate legs, a tranversely extending latching rod, said rod having a flexible rod length end portion, each said sector plate leg defining an accurate edge concentrically disposed about said second axis and formed with a plurality of equally spaced radially disposed notches adapted to receive an associated flexible rod length end portion of said tranversely extending latching rod;

said pivot bracket comprising a transversely extending support beam each end of which is fixed to a link arm, said pivot bracket being positioned between said base sector plates with each said link arm pivoted to an associated sector plate for rotation about said second axis;

said latching rod having an intermediate portion thereof secured to said beam with each said rod length end portion extending through an elongated slot, radially disposed about said second axis, in an associated link arm, whereby each said rod length end portion has a normal position received in an associated leg notch and each said rod length end portion is adapted for radial outward movement whereby it is removed from its associated notch and flexed into a radially outer portion of its associated link arm slot, thereby permitting fore and aft rotational adjustment of said pivot bracket and roller assembly about said second axis, and wherein release of each rod length end portion returns each said rod length to its normal position, received in latched engagement with a selected notch, thereby locking said pivot bracket and roller assembly in an arcuately adjusted position.

8. The adjustable sling seat as set forth in claim 1 wherein said roller assembly clutch means comprises a helical coil spring biased toward frictional engagement with a fixed annular housing wall enclosing said spring and concentrically encircling a pintle member having one end portion thereof pivotally supporting an opposed one end of said roller on said first axis, wherein turning a clutch rotary control knob, fixed to one end of said pintle member reduces said clutch frictional force and adjusts said webbing slack length, and wherein release of said knob allows said spring to increase its frictional force on said annular housing wall; and an axially extending coupling member, concentrically journaled on said pintle member, connects said pintle member to said one end of said roller, such that the weight of an occupant in said sling seat causes increased frictional spring force which assists in said clutch coupling member holding said webbing storage roller against rotation.

9. The adjustable sling seat as set forth in claim 8 wherein said coupling member comprises a spool portion having an axial bore receiving said one end portion of said spindle member therethrough, said spool portion supports a diametrically extending cross-blade on one end thereof, said cross-blade having each free end thereof received in an associated cutout formed in an opposed edge of said roller, said spool portion opposite end supports an axially extending drive key, received in an annular slot formed in a pintle spring retainer hub, whereby a tension load on said webbing slack length causes said spring to unwind, increasing its frictional force, wherein said clutch prevents further rotation of said roller assembly.

10. The adjustable sling seat as set forth in claim 1 wherein the overhead structure comprises a vehicle roof structure.

11. The adjustable sing seat as set forth in claim 1 wherein said webbing slack length is provided with a plurality of elongated cushions arranged in parallel spaced manner thereon and removably attached to said webbing side straps.

12. The adjustable sling seat as set forth in claim 1 including a three-point seat belt arrangement, said arrangement comprising a lap belt having one outboard end secured to an outboard floor mounted anchor and an inboard end removably secured to a tether strap buckle attached to a tether strap having its other end mounted to an inboard anchor, and a shoulder belt having one lower end fixed to said lap belt inboard end and its other upper end mounted to side wall means of the vehicle.

13. The adjustable sling seat as set forth in claim 2 wherein inboard and outboard rear anchorage slide mechanisms are mounted on the overhead structure in parallel longitudinally extending relation, each said mechanism having a longitudinally slidable locking device thereon, said webbing comprising a flexible elongated fabric having coextensive supporting inboard and outboard side straps secured to each side edge of said fabric, each said inboard and outboard side strap having an upper end length extending a predetermined dimension beyond a webbing fabric transverse upper end, each said inboard and outboard upper end length terminating in a free end connected to an associated inboard and outboard locking device.

14. The adjustable sling seat as set forth in claim 2 wherein said webbing comprises a flexible elongated fabric having coextensive supporting side straps secured to each side edge of said fabric, each said side strap having an upper end length extending a predetermined dimension beyond a webbing fabric upper transverse rigid crossmember terminus connected to each said side strap, said end lengths converging toward said rear slide mechanism, wherein each said end length terminates in a free end connected to said rear anchorage slide mechanism longitudinally slidable locking device.

* * * * *